Nov. 9, 1943.    F. W. MEREDITH    2,334,116
DIRECTIONAL GYROSCOPE
Filed Nov. 19, 1942

Inventor
F. W. Meredith
By: Watson, Cole, Grindle & Watson
Attorneys

Patented Nov. 9, 1943

2,334,116

UNITED STATES PATENT OFFICE 2,334,116

DIRECTIONAL GYROSCOPE

Frederick William Meredith, London, England, assignor to S. Smith & Sons (Motor Accessories) Limited, Cricklewood, London, England, a British company Application November 19, 1942, Serial No. 466,163
In Great Britain August 8, 1941

5 Claims. (Cl. 33—204)

This invention relates to directional gyroscopes of the kind provided with an indicator in which relative movement takes place between an indicating member moving with the gyro and another indicating member attached to the part in which the gyro is mounted. As is known, gyroscopes are subject to precession due to friction and the earth's rotation, and it is therefore necessary to provide means for re-setting the gyroscope. It has been proposed to effect re-setting of the gyro and its indicator after the gyro has precessed, by temporarily caging the gyroscope against precession and then rotating it to the desired position. Alternatively, the gyro has been caused to precess to the desired position. It has also been proposed to arrange for the indicating scale on the gyroscope to be detachable and to effect resetting by detaching the indicating scale and rotating it relatively to the gyroscope to the desired position, where it is re-attached. These prior arrangements are either complicated or are apt to disturb the gyroscope or both. One object of the present invention is to provide resetting means which do not necessitate detaching the indicating member from the gyroscope or disturbing the gyroscope.

According to this invention, a directional gyroscope of the kind referred to is characterised in that the gyro, the indicating member driven thereby, and an adjusting member of the resetting device, are interconnected by a differential gear, the normally fixed reaction member of which gear is connected with said adjusting member. For example, the indicating member is driven by the movement of the planet carrier of the differential gear, and the gyro and adjusting member are arranged to drive respectively the two crown wheels which engage the planet wheels on said carrier. A transmission between the gyro and indicating member may be such that the direction of rotation of the indicating member as viewed by the operator, is the same as that of the craft when viewed from above.

The indicating member may be arranged to rotate in a plane substantially parallel to the azimuth axis of the gyroscope.

The indicating member may be arranged to move over a normally fixed scale, and means may be provided for adjusting the position of said scale, while preferably simultaneously adjusting the position of the indicating member for the following purpose. The scale may be a compass scale, and when the craft is set into a new course, it may be that the indicating member is brought to an awkward position for viewing; to overcome this the indicating member may be brought to a convenient position, and in order to obtain correct bearing readings, the scale will require to be moved an equivalent amount.

The following is a description of one form of gyroscopic direction-indicating instrument according to this invention, reference being made to the accompanying drawing, in which.

Figure 1:
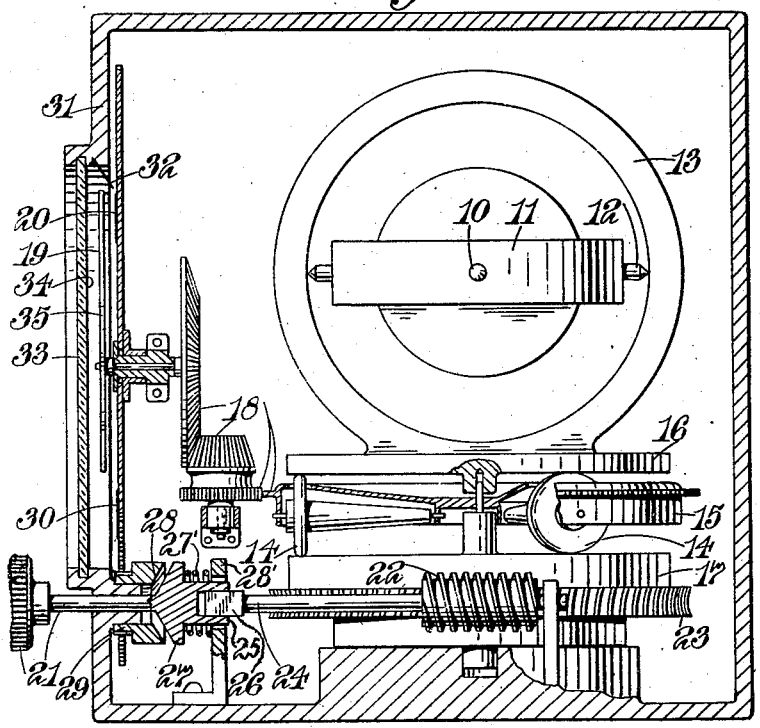
Figure 1 is a vertical section through the instrument.
Figure 2:
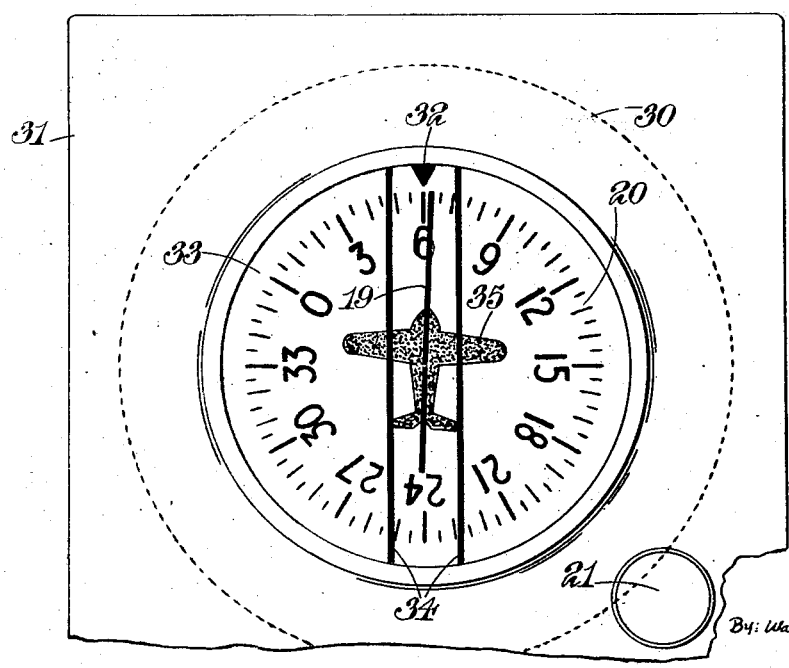
Figure 2 is an elevation looking from the left of Figure 1.

The gyroscope is of the usual form, in so far as it has a horizontal spin axis 10, an inner ring 11 pivoted about a horizontal axis 12, an outer or azimuth ring 13 mounted to rotate about a vertical axis and the usual anti-topple devices (not shown). The azimuth ring is mounted on a thrust bearing comprising rollers 14 mounted in a cage 15 between upper and lower races 16 and 17. The upper race 16 is secured to the azimuth ring so as to rotate therewith, and the bottom race, which is normally fixed, is, however, capable of rotation about the azimuth axis, as hereinafter described. The cage of the rollers is connected by gearing 18, with a pointer 19 mounted to rotate about a horizontal axis. The gearing is arranged to step up the rotation of the cage, and is also such that the pointer, as viewed by the operator, rotates in the same direction as the turning movement of the aircraft when viewed from above. The pointer is arranged to rotate over a compass scale 20 which is normally fixed, but which can be adjusted to rotate about the same axis as that of the pointer.

The resetting means comprises a gear drive between a setting member 21 and the bottom race 17, which gear drive is a worm 22 and wormwheel 23 of the irreversible kind, the wormwheel 23 being connected to the bottom race 17 and the worm through a shaft 24 to the setting member 21. Thus, when the setting member is not being operated, the bottom race is locked against movement. The setting member is axially movable in relation to said worm and has a square-section socket 25 which slidably engages a square-section part 26 of the shaft 24. In one of the axial positions of the setting member, in addition to engaging the worm shaft, a conical friction surfaced member 27 on the setting member engages a conical face 28 formed on a part of a pinion 29 which engages a toothed disc 30 carrying the compass scale 20. The two friction faces are normally maintained in engagement by a spring 27' compressed between a shoulder on member 27 and a bracket 28'. The gearing provided by the pinion and toothed disc is such that when the knob is rotated the scale is rotated at the same rate as the pointer, for the purpose above described.

It will therefore be seen that the thrust bearing forms a differential gear, one member of which (the top race 16) is driven by the azimuth ring 13, the second member of which (the bottom race 17) is driven by the resetting means 21, 22, 23, and the third member (the cage 15 for the rollers 14) drives the indicating pointer 19. Thus, when the bottom race 17 is fixed relatively to the case of the instrument, rotation of the top race 16 with the azimuth ring 13, will rotate the pointer 19 to indicate said movement.

If it is required to reset the pointer to a new position, it is only necessary to press in and rotate the setting member 21, thus rotating the bottom race 17 and so rotating the cage 15. In other words, a differential movement is fed into the connection between the pointer 19 and the azimuth ring 13 without the necessity for disconnecting the pointer from the azimuth ring or in any way disturbing the gyroscope.

A further advantage of the construction described above is that if after a course has been set on the card in the manner described above, the pointer is not vertical, the resetting member may be rotated in its normal axial position with the friction faces of elements 27 and 29 engaged whereby the pointer and card may be rotated together until the pointer is vertical. The casing 31 of the instrument may be provided with a fixed lubber mark 32 by means of which the setting of the compass scale 20 may be read and which also enables a deviation of course to be determined according to the position of the pointer 19 in relation thereto. The casing is provided with a window 33 marked with parallel lines 34 to emphasise small movements of the pointer 19. The pointer is also provided in known manner with a small silhouette 35 of an aeroplane to prevent ambiguity in the interpretation of the sense of a deviation.

The pointer may be extended beyond the periphery of the compass scale so that it can be seen through a second window when in the vertical position against a fixed scale with centre zero. It can then be used as a deviation indicator against this scale.

I claim:

1. A gyroscopic direction-indicating instrument comprising a rotatably adjustable indicating scale, a pointer adapted to rotate around said scale, a gyro, a rotatable setting device movable axially between two positions, an epicyclic differential gear interconnecting the gyro, setting device and pointer, and means operable by said setting device in one of its positions only for adjusting said rotatably mounted scale as well as said pointer.

2. A gyroscopic direction-indicating instrument comprising an indicating scale, an indicating member adapted to move over said scale, a gyro, a resetting device, an epicyclic differential gear connecting the gyro, indicating member and resetting device together whereby the indicating member may be moved both by the gyro and the resetting device, means affording a selectively operable connection between said resetting device and said scale for adjusting said scale along with said indicating member, and means for effecting said last named connection.

3. A gyroscopic direction-indicating instrument comprising a gyro, an indicating scale disposed in a plane substantially parallel to the azimuth axis of the gyro, an indicating member adapted to move over said scale, a resetting device for said member, an epicyclic differential gear comprising a sun element connected with said gyro, a second sun element having an irreversible connection with said resetting device to be driven thereby, and a planet element operatively connected with both of said sun elements, a planet carrier and means operatively connecting said indicating means with said planet carrier, all whereby there is provided an independent drive between the gyro and said indicating means and between the resetting device and said indicating means.

4. A gyroscopic direction-indicating instrument comprising a rotatably adjustable indicating scale, a pointer adapted to rotate around said scale, a gyro, a rotatable setting device movable axially between two positions, an epicyclic differential gear interconnecting the gyro, setting device and pointer, and a releasable frictional connection between said setting means and said scale and operable by said setting device in one of its positions for adjusting said rotatably mounted scale as well as said pointer.

5. A gyroscopic direction-indicating instrument comprising an indicating scale, an indicating member adapted to move over said scale, a gyro, a resetting device, an epicyclic differential gear connecting the gyro, indicating member and resetting device together whereby the indicating member may be moved both by the gyro and the resetting device, and means affording a selectively operable connection between said resetting device and said scale for adjusting said scale along with said indicating member.

FREDERICK WILLIAM MEREDITH.